United States Patent [19]
Loiselet et al.

[11] Patent Number: 4,968,149
[45] Date of Patent: Nov. 6, 1990

[54] KNEADER FOR DOUGH-LIKE MATERIAL, IN PARTICULAR FOR BREAD DOUGH

[75] Inventors: Michel Loiselet, Ales; Joël Musseau, Aubusson, both of France

[73] Assignee: Dito-Sama, Aubusson, France

[21] Appl. No.: 346,113

[22] PCT Filed: Jul. 6, 1988

[86] PCT No.: PCT/FR88/00361
§ 371 Date: Mar. 7, 1989
§ 102(e) Date: Mar. 7, 1989

[87] PCT Pub. No.: WO89/00007
PCT Pub. Date: Jan. 12, 1989

[30] Foreign Application Priority Data
Jul. 8, 1987 [FR] France .................. 87 09710

[51] Int. Cl.$^5$ .......................................... B28C 7/16
[52] U.S. Cl. ................................. 366/77; 366/189
[58] Field of Search ................ 366/69, 71, 72, 73, 366/77, 96, 97, 99, 98, 184, 188, 189, 194, 309, 310, 312, 313

[56] References Cited
U.S. PATENT DOCUMENTS
2,137,558  11/1938  Aeschbach ................... 366/77
4,765,746  8/1988   Puig ........................ 366/77

FOREIGN PATENT DOCUMENTS
424936  12/1937  Belgium .
419640  8/1910   France .

Primary Examiner—Robert W. Jenkins
Attorney, Agent, or Firm—Wenderoth, Lind & Ponack

[57] ABSTRACT

A kneader including a vat having an open upper part and structure for emptying the vat is characterized in that the structure includes at least one dough deflector a part of which extends, in the active position, into the vat and is adapted for emptying the vat and a device allowing a relative displacement of the basin, the dough, and the deflector to be effected. The deflector advantageously has a first end part adapted for removing dough at the bottom of the vat, an intermediate part adapted for raising the dough removed towards the upper part of the vat, and a second end part adapted for ejecting the dough towards the outside of the vat.

47 Claims, 13 Drawing Sheets

KNEADER FOR DOUGH-LIKE MATERIAL, IN PARTICULAR FOR BREAD DOUGH

BACKGROUND OF THE INVENTION

The present invention relates to a kneader for dough-like material, in particular for bread dough.

Since the beginning of the century the use of arduous manual kneading operation have progressively disappeared owing to the increasing mechanization of kneaders.

Indeed, a certain number of mechanical kneaders exist in the art which are of the type comprising a frame carrying a working vat in which plunges a dough working tool, this working tool being, for example, fixed on a tool support head which is itself carried by the frame.

Principally two types of kneaders exist, one termed a rotating vat type in which the vat is driven in rotation relative to the working tool which is fixed, and the other termed a rotating tool type in which the tool rotates relative to the vat which is fixed.

However, whatever the type of kneader, there remains a problem which resides in the emptying of the vat of the kneader. Indeed, there are at present two types of solutions for emptying a kneader vat. These solutions consist on the one hand of manually emptying the vat, i.e. the user extracts the dough from the vat of the kneader manually, and on the other hand, of mechanically emptying the vat which is achieved through the medium of means for turning over the vat.

The manual solution increases in difficulty with an increase in the size of the dough.

Moreover, the turning over means, which are, for example, in the form of raising arms, are relatively space-consuming, of high cost, awkward to use and therefore require very large investments in equipment and premises.

SUMMARY OF THE INVENTION

The object of the invention is to solve these problems by proposing a kneader equipped with means for emptying the vat which are simple, reliable, of low cost and permit the relatively easy and rapid emptying of this vat while working the dough and preparing it for subsequent treatments.

For this purpose, the invention provides a kneader for dough-like material, in particular for bread dough, of the type comprising a vat having an open upper part and means for emptying said vat, characterized in that said emptying means comprise at least one dough deflector a part of which extends, in the active position, into the vat and is adapted for emptying the vat by a relative displacement of the vat, the dough and the deflector.

According to a aspect of the invention, the deflector comprises a first end portion adapted to remove the dough in the bottom of the vat, an intermediate portion adapted to raise the removed dough toward the upper part of the vat and a second end portion adapted to eject the dough toward the exterior of the vat.

According to yet another aspect of the invention, the deflector comprises a blade constituting a scraper adapted to cooperate with the inner wall of the vat for removing and raising the dough.

BRIEF DESCRIPTION OF THE DRAWINGS

A better understanding of the invention will be had with the aid of the following description, given solely by way of example with reference to the accompanying drawings, in which.

DETAILED DESCRIPTION OF THE PREFERRED EMBODIMENTS

Figure 1:
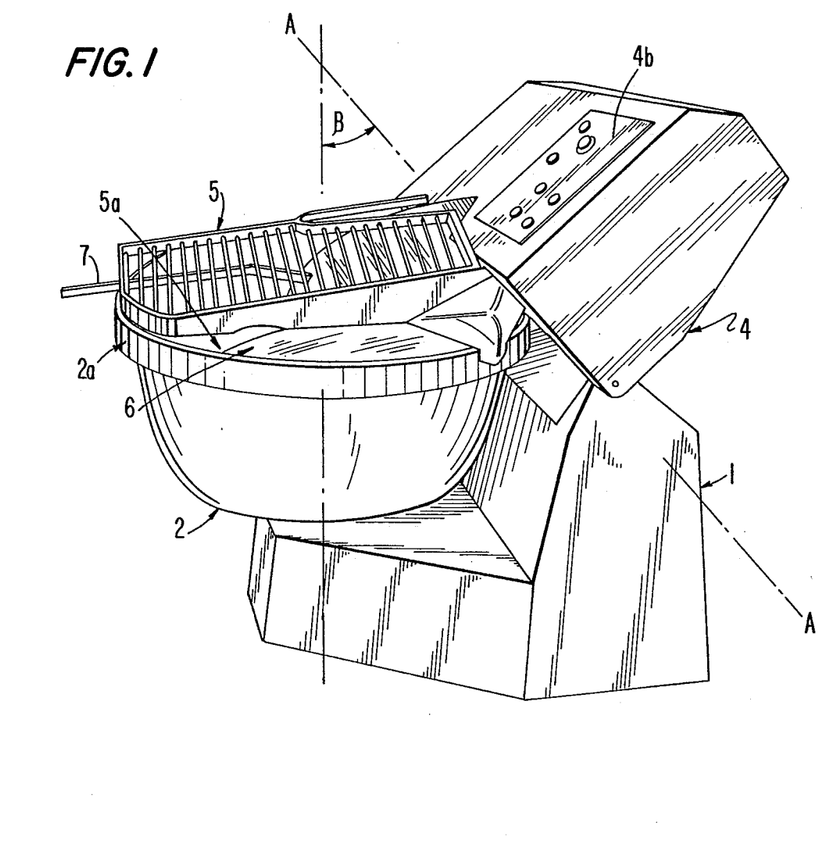
FIG. 1 represents a in perspective view of a kneader according to the invention, the different elements which are part of this kneader being shown in the active position.
Figure 2:
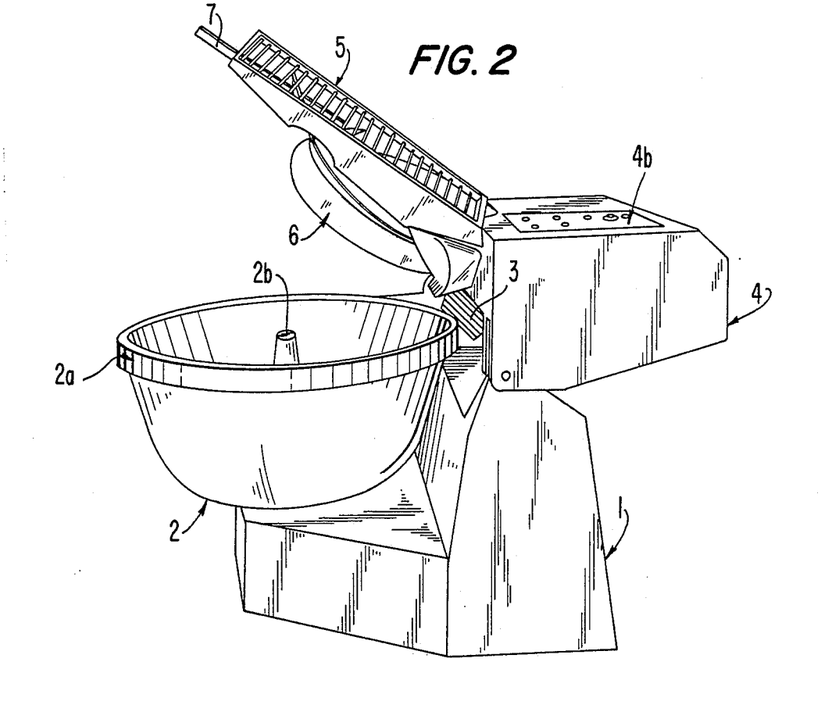
FIG. 2 represents a perspective view of the kneader according to the invention, the support head of the working tool being represented in the raised position and the deflector in the withdrawn position.
Figure 3:
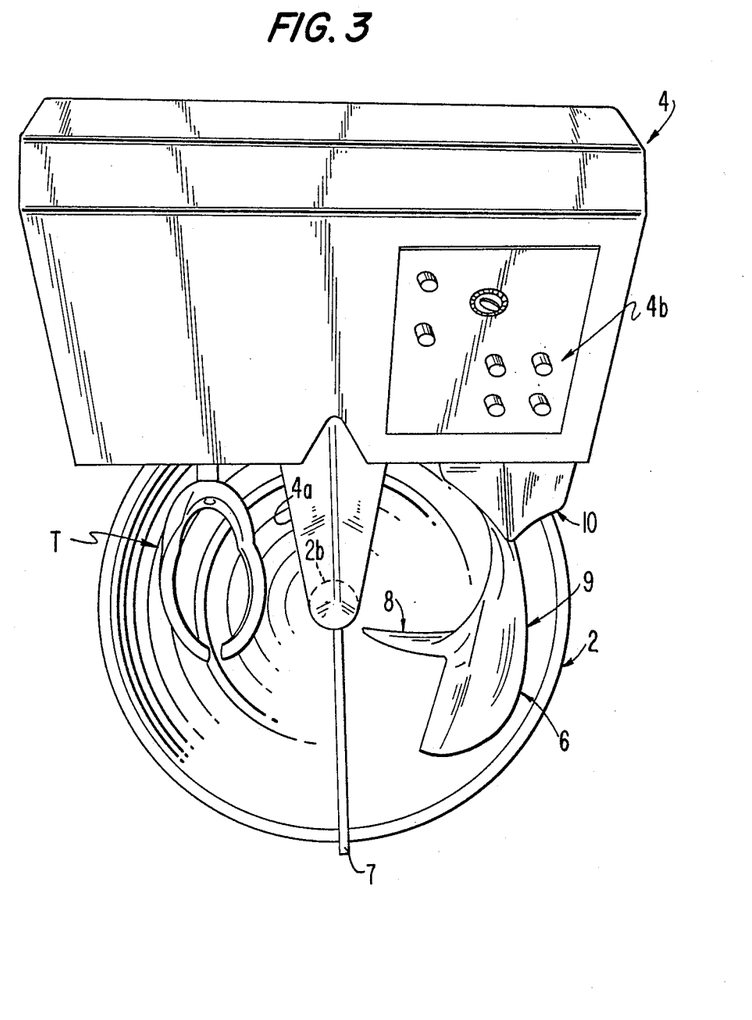
FIG. 3 represents a top view of the kneader represented in FIG. 1, the safety screen not being represented.

As can be seen in FIGS. 1, 2 and 3, a kneader according to the invention comprises a frame 1 on which is disposed a vat 2 driven in rotation, for example, at between 4 and 30 rpm, by any suitable means such as for example a bevel pulley 3 (FIG. 2) connected to an electric motor (not shown) and cooperating with a rolling track 2a provided on the upper part of the vat 2. A support head for a working tool 4 is also pivotally mounted on the frame 1 and is movable between a first position represented in FIG. 1, which will be termed hereinafter the lowered or active position, and a raised position illustrated in FIG. 2 which permits the user to have access to the interior of the vat, for example, for cleaning it. As the working tool T (FIG. 3) is of the type known per se, it will not be described in more detail. Note however that it is driven in rotation in a known manner for working the dough.

A safety screen 5 is also pivotally mounted on the support head of the tool and is movable between a position for closing the vat 2 and an opening position which also enables the user to have access to the interior of the vat. Of course, the support head of the working tool, the frame and the safety screen are equipped with any appropriate means for stopping the rotation of the working tool and/or of the vat, when the user shifts one of these elements A dough deflector 6, a part of which extends in the active position into the vat, is, for example, fixed to the support head of the tool 4 and is adapted to empty the vat by a relative displacement of the latter, the dough and the deflector as will be described in more detail hereinafter.

A handle 7 fixed on a projecting part of the support head of the tool 4 is also provided to enable the user to shift the support head between its two positions. The function of the projecting part 4a will be described in more detail hereinafter.

Also note that the safety screen 5 comprises a recess 5a allowing the passage of the deflector for the fixing thereof on the support head of the working tool and for allowing the user to have access to the interior of the vat between the deflector and this vat, for example, during the kneading of the dough so that he may touch this dough.

A control panel 4b may also be provided on the support head of the working tool 4.

Figure 4:
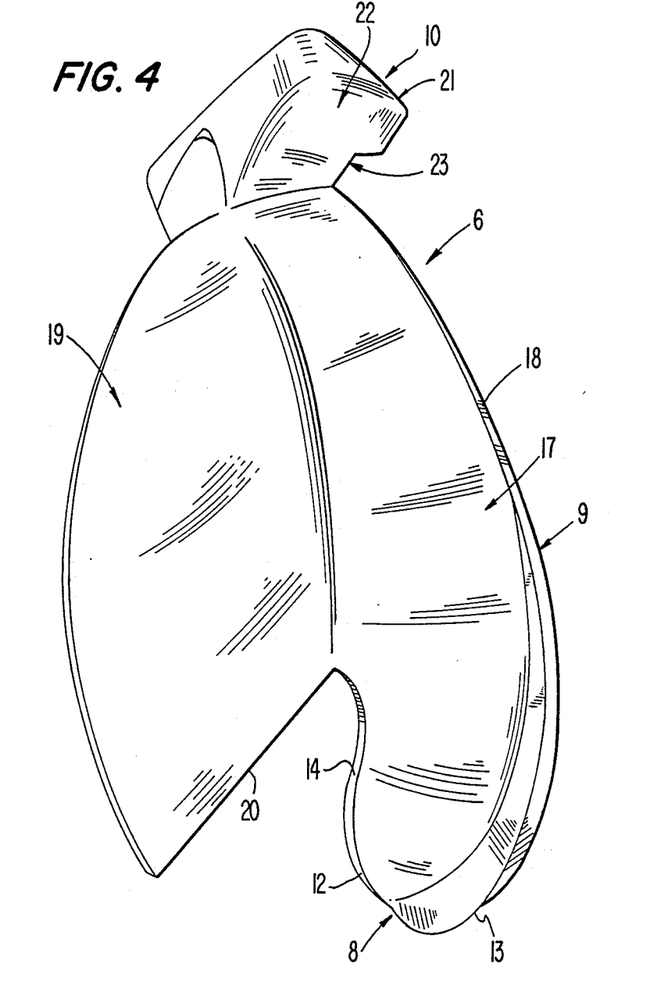
FIG. 4 represents a perspective view of a deflector which is part of a kneader according to the invention.
Figures 5, 6, 7:
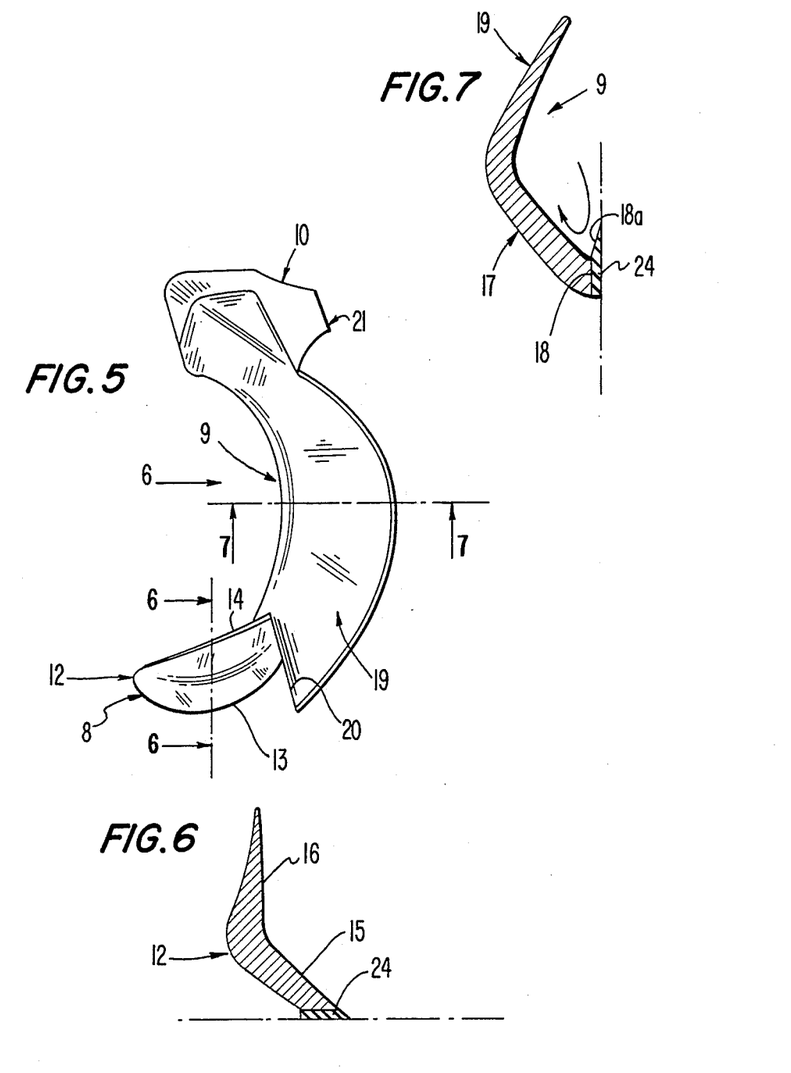
FIG. 5 represents another perspective view of the deflector shown in FIG. 4.
FIG. 6 represents a view in section taken along line VI—VI of FIG. 5.
FIG. 7 represents a view in section taken along line VII—VII of FIG. 5.

As represented in FIGS. 3, 4 and 5, the deflector 6, fixed on the support head of the tool, comprises a first end portion 8 adapted to remove the dough in the bottom of the vat 2, an intermediate portion 9 adapted to raise the dough removed in the bottom of the vat toward the upper part of the latter, and a second end portion 10 adapted to eject the dough toward the exterior of the vat.

The projecting part 4a (FIG. 3) of the support head of the working tool extends from the support head in the direction toward the axis of rotation of the vat 2 and cooperates with a part 2b projecting from the center of the latter in order to ensure a good guiding during the rotation of the vat.

As can be seen more particularly in FIGS. 4 and 5, the deflector 6, and more particularly the first end portion 8 of the latter, comprises a lip 12 forming a scraper adapted to remove the dough in the bottom of the vat and guide it toward the intermediate portion 9 of the deflector.

This lip 12 has a first edge 13 having a shape roughly complementary to that of the bottom of the vat and a second edge 14 adapted to separate, at least partly, the dough to be removed in the bottom of the vat from the rest thereof.

As represented in FIG. 6, the front face of the this lip 12 advantageously has a concavity transversely of the direction of displacement of the dough in the bottom of the vat. More particularly, this lip 12 comprises a first part 15 extending, in the active position of the deflector, at roughly 45° relative to the bottom of the vat and a second part 16 extending above the first at roughly 90° relative to the bottom of the vat, in the active position of the deflector.

Also note that this lip 12 extends, in the active position of the deflector, between the central part of the bottom of the vat and the periphery of the bottom and that it has a section which decreases in the direction toward the axis of the vat.

The intermediate portion 9 of the deflector is in the form of a portion of a guide channel for the dough which is inclined, in the active position of the deflector, relative to the axis of the vat and adapted to cooperate with the lateral edge of the latter so as to constitute a channel for raising the dough extending from the first end portion 8 of the deflector between the bottom of the vat 2 and the upper part of the latter.

As can be seen more particularly in FIG. 4, this dough raising channel has a section which decreases in the direction toward the upper part of the vat. As will be seen hereinafter, the general direction of the dough raising channel makes with a straight line parallel to the axis of the vat 2 an angle of between 30° and 55° and advantageously equal to 45°.

This intermediate portion 9 of the deflector 6 comprises a lip 17 (FIG. 4) forming a scraper, for guiding and raising the dough, connected in a continuous manner to the lip 12 of the first end portion 8 of the deflector. This lip 17 comprises an edge 18 having a shape which is roughly complementary to that of the lateral surface of the vat and a dough guiding wing 19. The lip 17 forms with the lateral surface of the vat (in dot - dash in FIG. 7) an acute angle in the active position of the deflector 6 so as to ensure, by a relative displacement thereof with respect to the vat, a slubbing and the raising of the dough.

As can be seen more clearly in FIG. 7, this lip 17 and the wing 19 of the intermediate portion 9 of the deflector is at least partly, in section, in the general shape of a V, the ends of the branches of which, in the active position of the deflector, face the lateral surface of the vat so as to define with the latter the dough raising channel.

If one returns to FIGS. 4 and 5, it can be seen that the wing 19 of the intermediate portion 9 of the deflector 6 comprises a tapered edge 20 connected to the second edge 14 of the lip 12 of the first end portion of the deflector and adapted to separate the part of the dough entering the intermediate portion of the deflector from the rest thereof The deflector is therefore in the form of a blade forming a scraper adapted to cooperate with the inner wall of the vat for removing and raising the dough.

The lip 12 of the first end portion 8 of the deflector is formed by a first surface portion of the blade forming the scraper, this surface extending between the central part of the bottom of the vat and the periphery of this bottom.

The lip 17 of the intermediate portion 9 of the deflector is constituted by a second surface portion of the blade forming a scraper, this surface portion extending from the first surface portion of the blade constituting the first end portion of the deflector, along the lateral surface of the vat between the bottom and the upper part of the vat for raising the dough.

Note that these first and second surface portions of the blade forming a scraper define a curved and continuous guiding and raising surface for the purpose of forming a regular path for the dough when it is removed and raised.

Also note with respect to FIG. 7 that the edge 18 of the intermediate portion of the deflector, having a shape complementary to that of the lateral surface of the vat, has an inclined flange 18a for guiding the dough, this flange facilitating the slubbing of the dough in the raising channel and preventing the dough from passing under the deflector.

If one returns to FIG. 4, it is found that the second end portion 10 of the deflector comprises a dough deviator 21 whose end is connected to the intermediate portion 9 of the deflector and whose other end emerges on the outside of the vat. This deviator comprises a portion presenting a curved guiding channel 22 one end of which is in the extension of the dough guiding and raising channel whereas the other end opens toward the exterior of the vat. This portion also comprises a cavity 23 for receiving the upper flange of the vat when the deflector is in the active position.

Also note that, as can be seen more particularly in FIGS. 6 and 7, a strip of rubbing material 24 is fixed to the edges of the deflector in contact, in the active position of the latter, with the vat. This rubbing material is advantageously formed by a self-lubricating plastics material of the type known per se and the strip 24 is detachably fixed on the edges of the deflector for purposes of being easily replaced if necessary. This strip also permits any possible defects of the vat to be compensated for.

If reference is made more particularly to FIG. 7, it is found that the inclined flange 18a for guiding the dough of the intermediate portion 9a of the deflector is in fact constituted by an inclined flange of the strip 24 of rubbing material.

Figure 8:
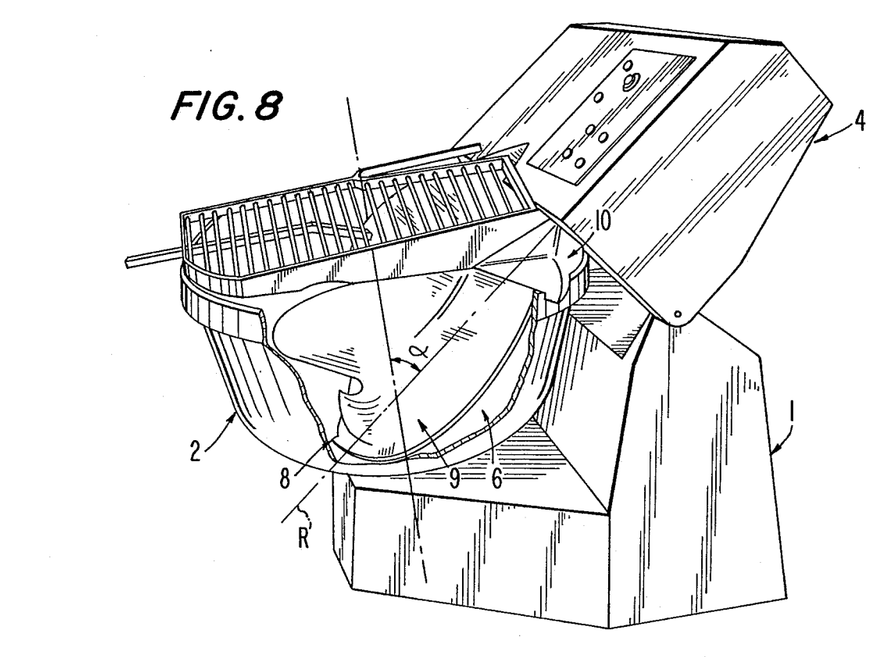
FIG. 8 represents a perspective view with parts cut away, of a kneader according to the invention.

As can be seen in FIGS. 3 and 8, the lip of the first end portion 8 of the deflector 6 extends between the central part of the vat and the periphery of the vat and is therefore adapted to remove the dough in the central part of the vat and direct it toward the intermediate portion 9 of the deflector which extends along the lateral wall of the vat between the bottom and the upper part of the latter for raising the dough toward the second end portion 10 of the deflector which ensures the ejection thereof toward the exterior of the vat.

This ejection is possible owing to the nature of the material to be emptied which is dough-like and is, when it rises, in the form of a roll of dough which progressively tapers in the direction of the upper part of the vat owing to the decreasing section of the dough raising channel.

As mentioned before, the general direction of the dough raising channel, illustrated by reference R in FIG. 8, makes with a straight line parallel to the axis of the vat an angle $\alpha$ which is advantageously equal to 45°.

Figure 9:
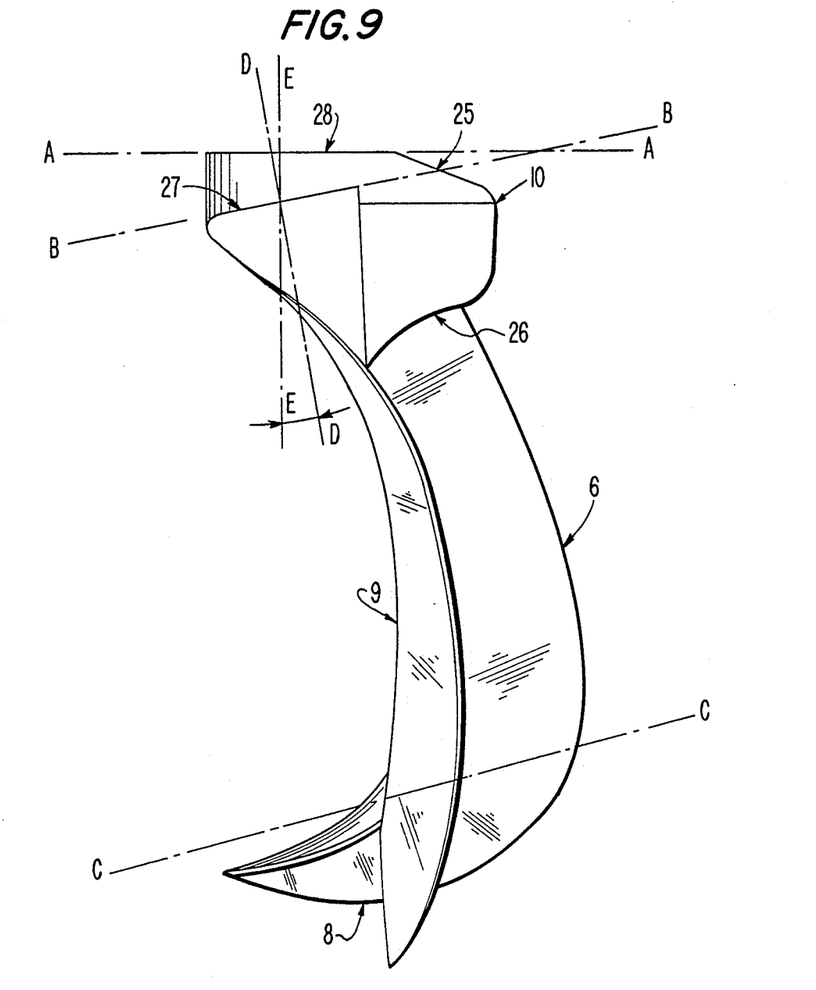
FIG. 9 represents a top view of a deflector which is part of a kneader according to the invention.
Figure 10:
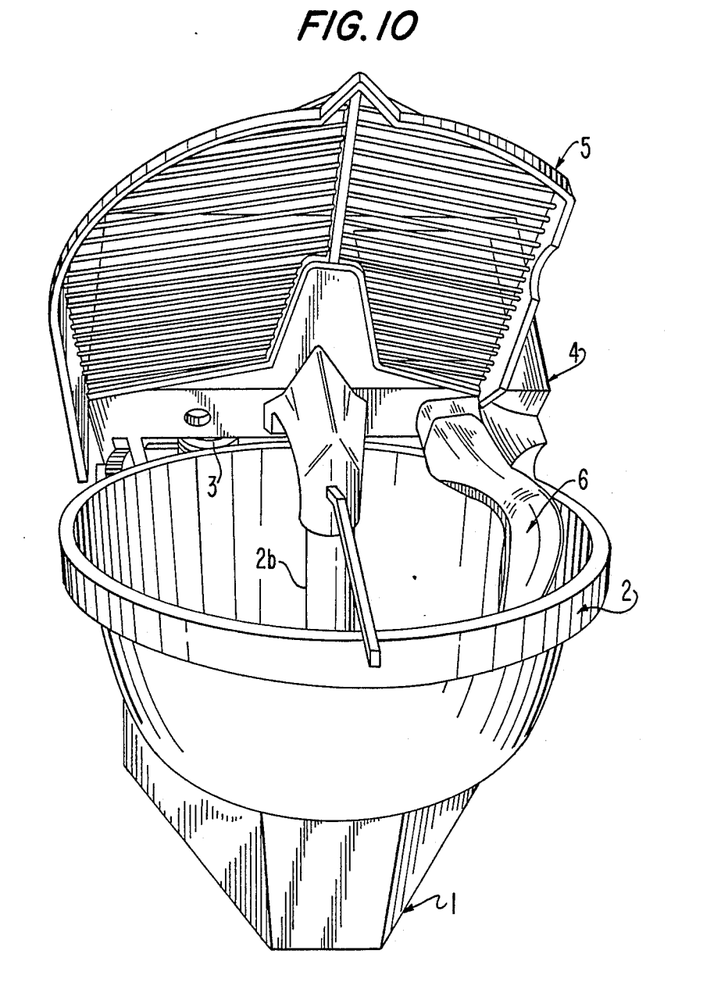
FIG. 10 represents a front view of a kneader according to the invention, the safety screen being represented in the raised position and the deflector in the active position.
Figure 11:
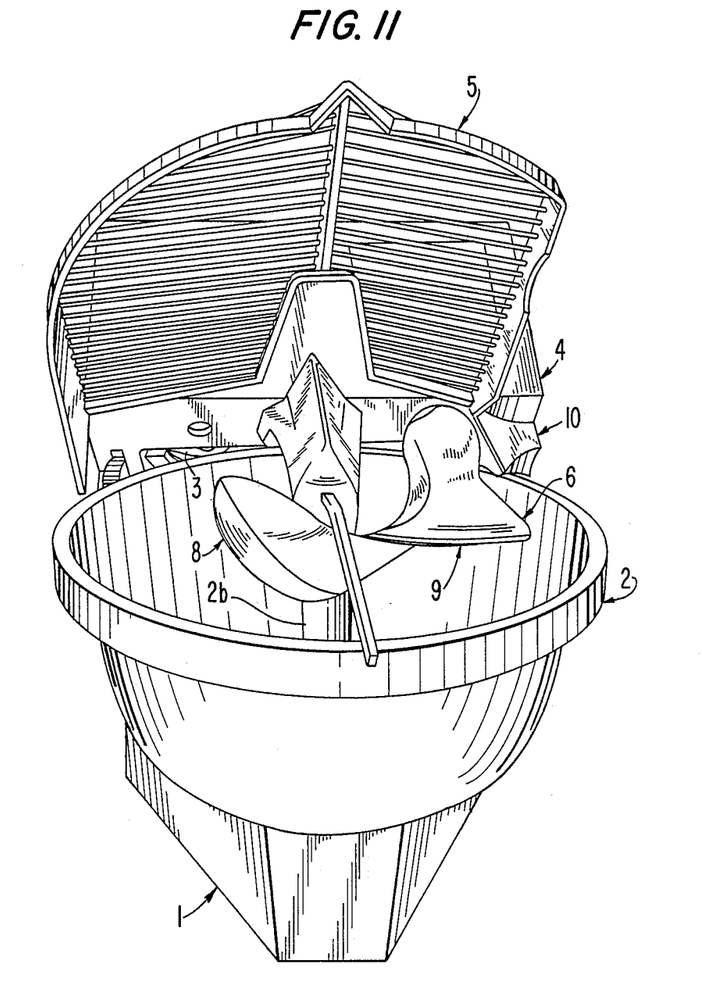
FIG. 11 represents a view similar to FIG. 10, the deflector being represented in the withdrawn position.

As can be seen in FIGS. 9, 10 and 11, and as mentioned above, the deflector 6 may be fixed to the support head of the working tool 4 and may be mounted to be movable between an active position as represented in FIG. 10 and a withdrawn position as represented in FIG. 11, in which the deflector has effected a rotation about its pivotal axis on this support head of the tool 4 so as to be disengaged in a position in which the ends of the V formed by the lip and the wing of the intermediate portion of the deflector 6 face the bottom of the vat.

As can be seen more particularly in FIG. 11, the first end portion 8 and the intermediate portion 9 of the deflector 6 are, for example, a single piece movably mounted relative to the second end portion 10 of the deflector, this second end portion being fixed to the support head of the working tool 4.

Indeed, as is represented in FIG. 9, the deflector 5, and more particularly the second end portion 10 of the latter, advantageously comprises a fixing base 25 of the deflector on the support head of the working tool. This base 25 comprises a first surface portion 26 defining the curved dough ejecting channel extending from the intermediate portion 9 of the deflector, a second surface portion 27 defining an articulation plane B—B between the intermediate portion 9 and the base 25 of the deflector, and a third surface portion 28 defining a fixing plane A—A of the base and therefore of the deflector on the support head of the working tool.

Returning to FIG. 1, it can be seen that in the active position of the deflector, the plane A—A of the fixing of the deflector and more particularly of the base of the latter on the support head of the working tool, makes with a plane passing through the axis of the vat an angle $\beta$ of roughly 45°.

Moreover, and still in the active position of the deflector, the pivot plane B—B (FIG. 9) between the intermediate portion 9 of the deflector and the base 25 of the latter, in the region of the second surface 27 of the base is parallel to a plane C—C passing through the axis of the vat and is therefore vertical in the active position of the deflector.

In order to permit the deflector, and more particularly the first end portion 8 of the latter, to pass beyond the projecting part 2b located in the center of the vat, when it is shifted toward its withdrawn position, the axis D—D (FIG. 9) of the fixing of the intermediate portion 9 of the deflector on the second end portion 10 of the latter, which is perpendicular to the pivot plane B—B around which the intermediate portion of the deflector turns, is angularly offset toward the corresponding lateral edge of the vat of the kneader relative to the plane E—E perpendicular to the plane A—A of the fixing of the second end portion of the deflector on the support head of the working tool.

Advantageously, this axis D—D is offset about 10° to the plane E—E.

The displacement of the intermediate portion of the deflector toward the withdrawn position can be effected by any known means, under the control, for example, of a wheel or an actuating lever which laterally projects from the support head of the tool or the fixing base of the deflector.

In the described embodiment, the deflector is therefore mounted to be movable between an active position and a withdrawn position relative to the support head of the working tool.

According to a second embodiment, the deflector remains in the active position inside the vat of the kneader when working the dough. In this case, the deflector comprises withdrawable means for the neutralization of the ejection by guiding the dough back toward the interior of the vat.

Figure 12:
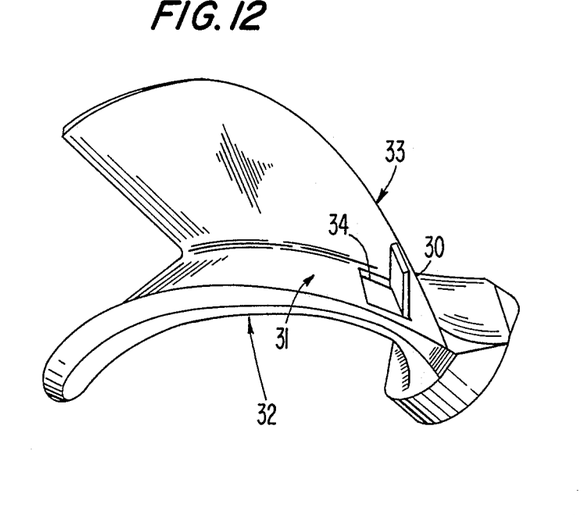
FIG. 12 represents a perspective view of a second embodiment of a deflector which is part of the construction of a kneader according to the invention.

These withdrawable means comprise for example a flap 30 (FIG. 12) provided in the lip 31 of the intermediate portion 32 of the deflector 33 and movable between a position withdrawn into the lip and closing an opening 34 of the lip communicating with the vat and an active position for guiding the dough toward the interior of the vat through the opening 34. In this case, the deflector behaves as a dough working tool.

In the foregoing description, the vat is driven in rotation relative to the deflector connected to the support head of the working tool which is fixed, but it will be understood that the vat may also be fixed and the deflector driven in rotation relative to the latter to empty the vat of dough also by a relative displacement between the vat, the dough and the deflector.

In all cases, the dough which is in this way ejected from the vat is in the form of a roll at the outlet of the ejection portion of the deflector. Apart from the fact that this dough roll has been worked during the rising thereof along the intermediate portion of the deflector, it is also easily recovered for example by conveyor means for conveying it to other treatment means;

Of course, the kneader according to the invention may also be applicable to materials other than bread dough, namely for example putties, asphalts, etc.

Advantageously, the deflector is shifted toward its active position in the vat when the latter is in rotation, which facilitates its penetration into the dough by the combined effect of the forces induced by the relative movements.

Furthermore, the deflector just described may also be adapted to other types of kneaders such as kneaders having an oblique axis, having a spiral arm, having alternating arms, etc.

It will be understood that the deflector may be any suitable material, as for example aluminium for food.

Figure 13:
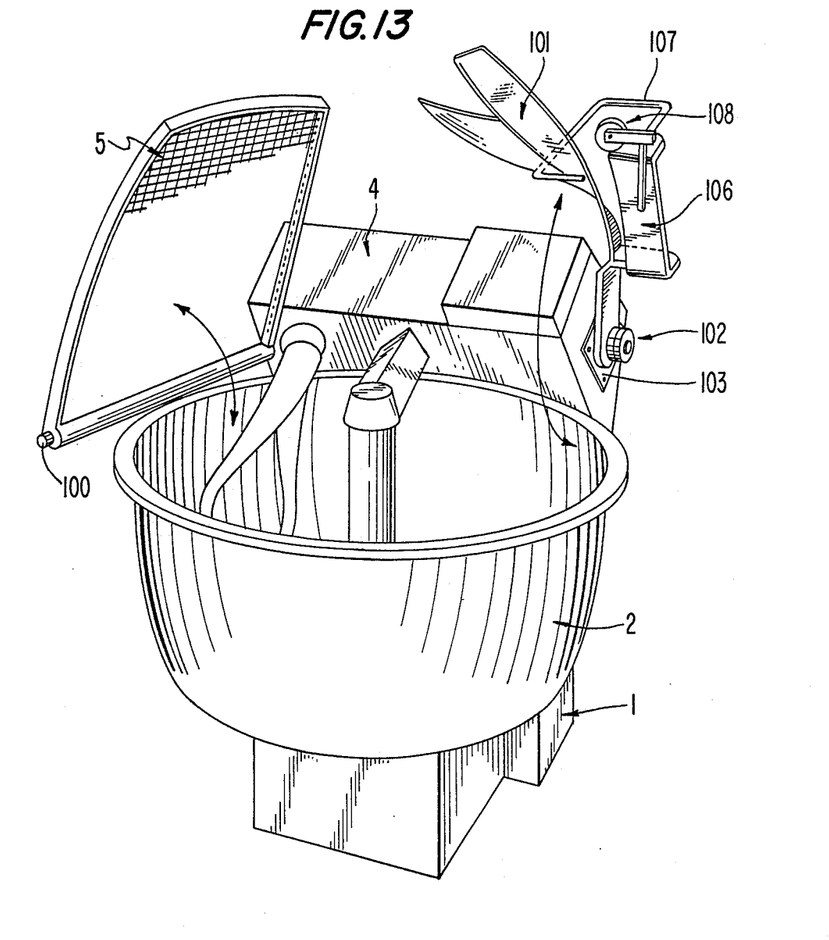
FIGS. 13 and 14 represent views in perspective of another embodiment of a deflector and a kneader according to the invention.
Figure 14:
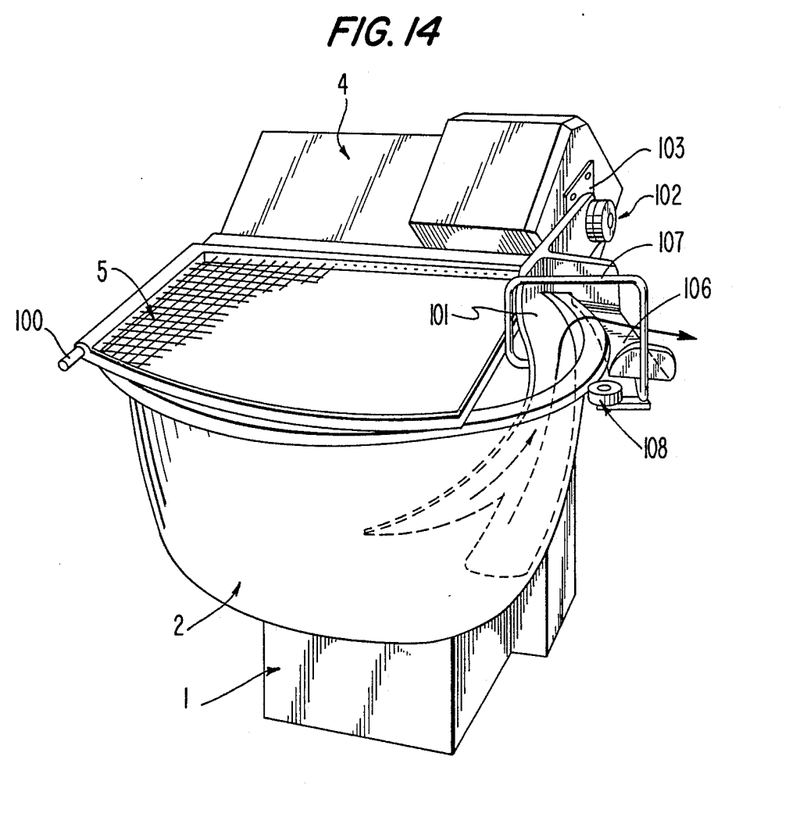

As can be seen in FIGS. 13 and 14, which represent views in perspective of another embodiment of a kneader according to the invention, the latter still comprises the frame 1 on which is disposed the vat 2 driven in rotation by any appropriate means.

The kneader represented in these Figures further comprises the support head of the working tool 4 pivotally mounted on the frame 1 and a safety screen 5 pivoted to the support head of the working tool 4 for movement between a position for closing the upper part of the vat and a withdrawn position, for example, about a pivot rod 100 extending from one of the sides of the support head of the working tool.

A dough deflector 101 is also pivotally mounted on the support head of the working tool 4 for example at 102 on the opposite side to the pivot rod 100 of the screen so as to be movable in rotation about an axis roughly transverse to the support head of the working tool 4 between its active position and its withdrawn position, as represented in these FIGS. 13 and 14.

Figure 15:
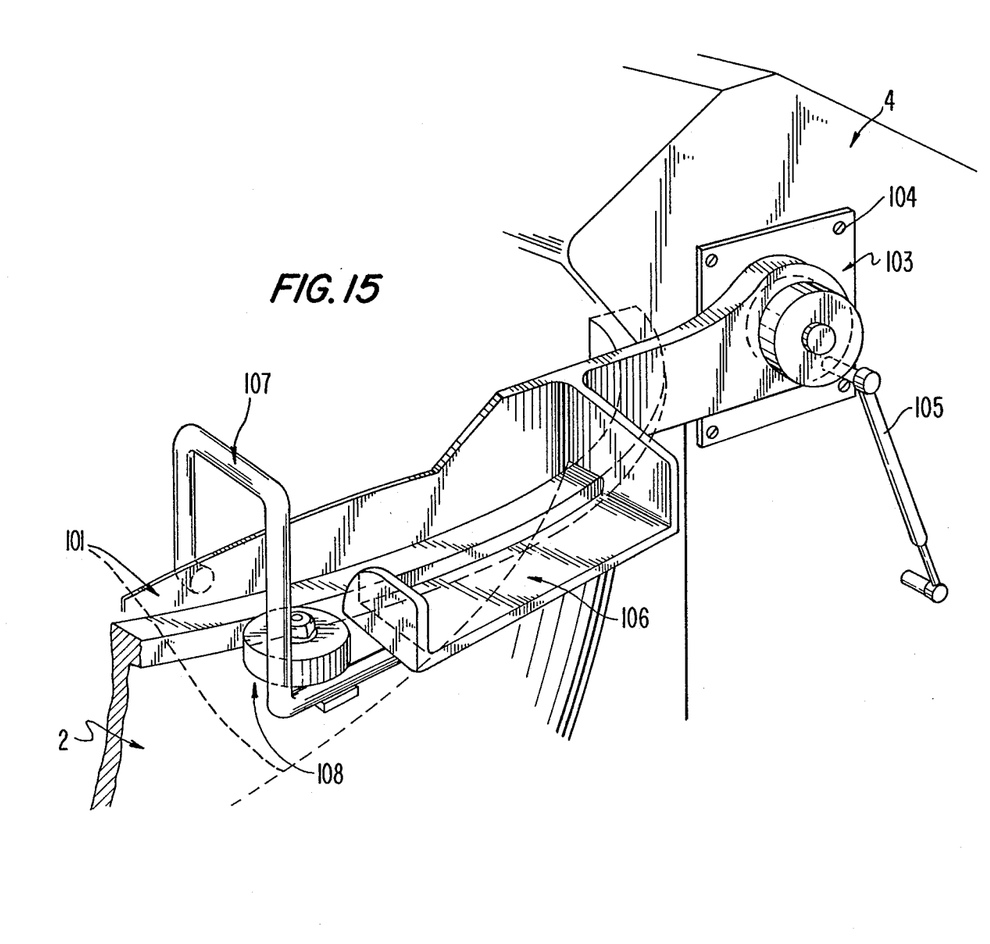
FIG. 15 represents a detailed view of the deflector which is part of the kneader represented in FIGS. 13 and 14.

As can be seen more clearly in FIG. 15, the pivoting of this deflector 101 to the support head of the working tool 4 is ensured by means of a pivot pin cooperating with the deflector and a support base 103 fixed to the support head of the working tool 4, for example, by means of screws 104. This pivot advantageously comprises means for adjusting the position of the deflector relative to the vat to permit, for example, the deflector to be moved toward the inner surface of the vat. These adjusting means are constituted, for example, by the means 104 for fixing the base to the support head of the working tool 4.

Indeed, the screws 104 permit the position of the base to be adjusted and therefore adjustment of the position of the deflector relative to the support head of the working tool so as to permit the adjustment of the position of the deflector relative to the vat.

It will be understood that other embodiments of the pivot means and the adjusting means are possible.

Moreover, means 105 constituted, for example, by a pneumatic jack are also provided for maintaining the deflector in the withdrawn position so that it does not drop.

As also represented in this FIG. 15, the deflector, and more particularly the second portion of the latter, comprises dough guiding means which, in the active position of the deflector 101, extend outside of the vat under the upper edge of the latter. These guiding means comprise for example a U-shaped member 106 for guiding the dough after it has passed over the upper edge of the vat when ejected from the latter.

These guiding means permit, for example, the dough to be guided when it is ejected toward other dough working means.

The deflector also comprises a shifting handle 107 enabling the user to easily shift the deflector between its two positions.

Furthermore, this part of the deflector is also provided with means 108 for maintaining the deflector in contact against the inner surface of the vat. These means are constituted, for example, by a roller cooperating with guide surface such as a rolling track on the outer surface of the vat or a shoe rubbing against the latter for ensuring a good bearing of the deflector against the inner surface of the vat, and therefore a good extraction of the dough, thereby enabling, for example, certain defects of the vat to be compensated for.

It will be understood that other embodiments of these dough guide means and means for maintaining the deflector in contact against the inner surface of the vat may be envisaged.

We claim:

1. Kneader for dough-like material, in particular for bread dough, comprising: a vat having an open upper part; and emptying means for forming a mass of dough-like material when disposed in the vat into a roll, raising the dough-like material in the vat, and emptying the vat of the dough-like material, said emptying means comprising a dough deflector a part of which extends, in an active position, into the vat, said deflector comprising a blade constituting a scraper adapted to cooperate with the inner wall of the vat to remove and raise dough-like material disposed in the vat, and means for allowing the vat, dough-like material disposed in the vat, and the deflector to be displaced relative to one another.

2. Kneader according to claim 1, characterized in that said deflector comprises a first end portion adapted to remove the dough in the bottom of the vat, an intermediate portion adapted to raise the removed dough toward the upper part of the vat, and a second end portion adapted to eject the dough toward the exterior of the vat.

3. Kneader according to claim 2, characterized in that said first end portion of the deflector comprises a lip forming said scraper, adapted to remove the dough in the bottom of the vat and guide it toward the intermediate portion of said deflector.

4. Kneader according to claim 3, characterized in that said lip forming said scraper defines a first edge having a shape roughly complementary to that of the bottom of the vat and a second edge adapted to separate dough-like material when disposed in the vat into a part to be removed.

5. Kneader according to claim 3, characterized in that said lip extends in the active position of the deflector between the center part of the bottom of the vat and the periphery of the bottom.

6. Kneader according to claim 3, characterized in that said lip has a section which decreases in the direction toward the axis of the vat.

7. Kneader according to claim 4, characterized in that the lip has a front face defining a concavity transverse to the direction of movement of the dough.

8. Kneader according to claim 7, characterized in that said lip comprises a first part extending, in the active position of the deflector, at roughly 45° relative to the bottom of the vat, and a second part extending above the first, roughly at 90° relative to the bottom of the vat in the active position of the deflector.

9. Kneader according to claim 2, characterized in that said intermediate portion of said deflector is in the shape of a portion of a dough guiding channel which is inclined, in the active position of the deflector, relative to the axis of the vat and adapted to cooperate with the lateral surface of the latter so as to constitute a dough raising channel extending from the first end portion of the deflector between the bottom of the vat and the upper part of the latter.

10. Kneader according to claim 9, characterized in that said dough raising channel has a section which decreases in a direction toward the upper part of the vat.

11. Kneader according to claim 9, characterized in that the general direction of the dough raising channel makes with a straight line parallel to the axis of the vat an angle of between 30° and 45°.

12. Kneader according to claim 11, characterized in that said angle is equal to 45°.

13. Kneader according to claim 2, characterized in that the second end portion of the deflector comprises a dough deviator one end of which is connected to the intermediate portion of the deflector whereas the other end emerges on the outside of the vat.

14. Kneader according to claim 13, characterized in that said deviator comprises a portion presenting a curved guiding channel one end of which is in the extension of the dough guiding and raising channel and the other end of which emerges toward the exterior of the vat, said portion defining a recess for receiving the upper flange of the vat.

15. Kneader according to claim 2, characterized in that the second portion of the deflector comprises dough guiding means which extend, in the active position of the deflector, outside the vat below the upper edge of the latter.

16. Kneader according to claim 15, characterized in that the guide means comprise a U-shaped member.

17. Kneader according to claim 1, characterized in that the vat has an inner lateral surface and an inner bottom surface defining the inner wall of the vat, and said intermediate portion of the deflector comprises a lip forming said scraper for guiding and raising dough-like material, connected in a continuous manner to said first end portion of said deflector and defining an edge having a shape which is roughly complementary to that of the lateral surface of the vat, and a dough guiding wing, the lip forming said scraper making with the lateral surface of the vat an acute angle, in the active position of the deflector, so as to ensure, by relative displacement with the lateral surface of the vat, a slubbing and the raising of dough-like material disposed in the vat.

18. Kneader according to claim 17, characterized in that the lip and the wing of said intermediate portion of the deflector are, at least partly, in section, in the general shape of a V the ends of the branches of which, in the active position of the deflector face the lateral surface of the vat so as to define with the lateral surface a raising channel.

19. Kneader according to claim 17, characterized in that the first end portion of the deflector comprises a lip defining an edge, and said wing of the intermediate portion of the deflector defines a tapered edge contiguous to the edge defined by the lip of the first end portion of said deflector and adapted to separate dough-like material when disposed in the vat into a part that passes along the intermediate portion of the deflector.

20. Kneader according to claim 17, characterized in that the edge of the intermediate portion of the deflector, which has a shape complementary to that of the lateral surface of the vat, forms an inclined dough guiding flange.

21. Kneader according to claim 20, characterized in that the deflector defines edges thereof in contact with the vat in the active position of the deflector, and said inclined dough guiding flange is constituted by an inclined flange of a strip of rubbing material fixed to edges of the deflector in contact with the vat in the active position of the deflector.

22. Kneader according to claim 1, characterized in that the first end portion of the deflector comprises a lip formed by a first surface portion of the blade constituting a scraper, said first surface portion extending between the central part of the bottom of the vat and the periphery of the bottom.

23. Kneader according to claim 22, characterized in that the vat has an inner lateral surface and an inner bottom surface defining the inner wall of the vat, and the intermediate portion of the deflector comprises a lip formed by a second surface portion of the blade constituting a scraper, extending from the first surface portion of the blade along the lateral surface of the vat between the bottom and the upper part of the vat.

24. Kneader according to claim 23, characterized in that said first and second surface portions of the blade constituting a scraper define a curved and continuous dough guiding and raising surface.

25. Kneader according to claim 1, characterized in that the deflector defines edges thereof in contact with the vat in the active position of the deflector, and a strip of rubbing material is fixed to the edges of the deflector in contact with the vat in the active position of the deflector.

26. Kneader according to claim 25, characterized in that said rubbing material is constituted by a self-lubricating plastics material.

27. Kneader according to claim 25, characterized in that said strip is detachably fixed to the edges of said deflector.

28. Kneader according to claim 1, in which said vat is supported by a frame, said means for allowing a relative displacement comprises actuating means for driving said vat in rotation, and wherein a support head of a working tool is carried by said frame, and said at least one deflector is fixed to the support head of the working tool and is mounted to be movable between said active position and a withdrawn position.

29. Kneader according to claim 28, characterized in that said second end portion of the deflector is fixed to the support head of the working tool and said first end portion and said intermediate portion of the deflector are mounted to be movable relative to this second end portion of the deflector between the active position and the withdrawn position.

30. Kneader according to claim 29, characterized in that said first end portion and said intermediate portion are mounted to be rotatable about a fixing axis on said second end portion of the deflector by control means.

31. Kneader according to claim 30, characterized in that the vat has an inner lateral surface and an inner bottom surface defining the inner wall of the vat, and said intermediate portion of the deflector comprises a lip forming said scraper for guiding and raising dough-like material, connected in a continuous manner to said first end portion of said deflector and defining an edge having a shape which is roughly complementary to that of the lateral surface of the vat, and a dough guiding wing, the lip forming said scraper making with the lateral surface of the vat an acute angle, in the active position of the deflector, so as to ensure, by relative displacement with the lateral surface of the vat, a slubbing and the raising of dough-like material when disposed in the vat, the lip and the wing of said intermediate blade of the deflector are, at least partly, in section, in the general shape of a V the ends of the branches of which, in the active position of the deflector face the lateral surface of the vat so as to define with the lateral surface a raising channel and, in the withdrawn position, the ends of the branches of the V constituted by the lip and the wing of the intermediate portion of the deflector face the bottom of the vat.

32. Kneader according to claim 29; characterized in that said second end portion of the deflector comprises a base for fixing the deflector on the support head of the working tool, said base comprising a first surface portion defining a curved dough ejecting channel extending from the intermediate portion of the channel, a second surface portion defining a pivot plane between the intermediate portion and the base of the deflector, and a third surface portion defining a fixing plane for the base on the support head of the working tool. characterized in that said second end portion of the deflector comprises a base for fixing the deflector on the support head of the working tool, said base comprising a first surface portion defining a curved dough ejecting channel extending from the intermediate portion of the channel, a second surface portion defining a pivot plane between the intermediate portion and the base of the deflector, and a third surface portion deforming a fixing plane for the base on the support head of the working tool.

33. Kneader according to claim 32, characterized in that, in the active position of the deflector, the fixing plane of the base on the support head of the working tool makes with a plane passing through the axis of the vat an angle of roughly 45°.

34. Kneader according to claim 32, characterized in that, in the active position of the deflector, the pivot plane between the intermediate portion of the deflector and the base is parallel to a plane passing through the axis of the vat.

35. Kneader according to claim 31, characterized in that the vat has an inner lateral surface and an inner bottom surface defining the inner wall of the vat, the base of the deflector engages the support head of the working tool along a fixing plane, and an axis about which the intermediate portion of the deflector is fixed on the second end portion of the deflector is angularly offset toward the corresponding lateral surface of the vat of the kneader, relative to a plane perpendicular to the fixing plane.

36. Kneader according to claim 35, characterized in that said axis if offset roughly 10°.

37. Kneader according to claim 28, characterized in that a safety screen is mounted on said support head of the working tool, to pivot between a position for closing the upper part of the vat and an opening position permitting access to the interior of the latter, said safety screen defining a recess for the passage of the deflector and the access to the interior of the vat.

38. Kneader according to claim 28, characterized in that the support head of the working tool is pivoted to the frame and movable between a lowered working position and a raised position.

39. Kneader according to claim 28, characterized in that said deflector is mounted to be movable in rotation about an axis roughly transverse to the support head of the working tool between its active position and its withdrawn position.

40. Kneader according to claim 39, characterized in that it comprises means for adjusting the position of the deflector relative to the vat.

41. Kneader according to claim 40, characterized in that a pivot pivots the deflector to the head about said axis and comprises a pivot pin cooperating with the deflector and a support base fixed to the support head of the working tool, the adjustment of the position of the deflector relative to the vat being ensured by means for fixing the base on the support head.

42. Kneader according to claim 1, in which said vat is supported by a frame, said means for allowing a relative displacement comprises actuating means for driving said vat in rotation, and wherein a support head of a working tool is carried by said frame, and said deflector is fixed to said support head of the tool and it comprises withdrawable means for neutralizing the emptying of the vat, adapted to guide dough-like material raised by said blade back toward the interior of the vat.

43. Kneader according to claim 42, characterized in that said withdrawable means comprise a flap provided in a lip of an intermediate portion of the deflector and movable between a withdrawn position in the lip and an active position for guiding dough-like material back toward the interior of the vat through an opening in the deflector.

44. Kneader according to claim 1, characterized in that the deflector comprises a shifting handle.

45. Kneader according to claim 1, characterized in that it comprises means for maintaining the deflector in contact against the inner surface of the vat.

46. Kneader according to claim 45, characterized in that the maintaining means comprise an element for guiding the deflector and cooperating with a guide surface on the outer edge of the vat.

47. Kneader according to claim 46, characterized in that the guide element comprises a roller or a rubbing shoe cooperating with a track of the outer surface on the vat for applying the deflector against the vat.

* * * * *